United States Patent
Zhou et al.

(10) Patent No.: US 9,838,074 B2
(45) Date of Patent: Dec. 5, 2017

(54) CROSSTALK SUPPRESSION METHOD AND APPARATUS

(71) Applicant: Huawei Technologies Co., Ltd., Shenzhen, Guangdong (CN)

(72) Inventors: Xiaoping Zhou, Shenzhen (CN); Yinghua Dong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 20 days.

(21) Appl. No.: 14/742,434

(22) Filed: Jun. 17, 2015

(65) Prior Publication Data

US 2015/0288418 A1 Oct. 8, 2015

Related U.S. Application Data

(63) Continuation of application No. PCT/CN2012/087541, filed on Dec. 26, 2012.

(51) Int. Cl.
*H04B 10/2507* (2013.01)
*H04B 3/32* (2006.01)
*H04B 10/69* (2013.01)
*H04B 10/2575* (2013.01)
*H04B 10/40* (2013.01)

(52) U.S. Cl.
CPC .......... *H04B 3/32* (2013.01); *H04B 10/2507* (2013.01); *H04B 10/2575* (2013.01); *H04B 10/40* (2013.01); *H04B 10/697* (2013.01)

(58) Field of Classification Search
CPC .......... H04B 10/2507; H04B 10/25073; H04B 10/2537; H04B 10/40; H04B 10/697–10/6973; H04B 3/32–3/493

USPC ..... 398/25–34, 158–161, 192, 194, 208–213
See application file for complete search history.

(56) References Cited

U.S. PATENT DOCUMENTS

| 6,509,984 B1 | 1/2003 | Gustavsson |
| 6,618,480 B1 * | 9/2003 | Polley ..................... H04B 3/23 379/406.05 |
| 6,999,679 B2 * | 2/2006 | Lenosky ................ H04B 10/43 398/136 |

(Continued)

FOREIGN PATENT DOCUMENTS

| CN | 1279848 A | 1/2001 |
| CN | 1488963 A | 4/2004 |

(Continued)

*Primary Examiner* — Li Liu

(57) ABSTRACT

Embodiments of the present invention provide a crosstalk suppression method and apparatus. By obtaining a first electrical signal indicating a data bit stream of a first optical signal output by a laser diode (LD) in an optical transceiver module and a transmission parameter of a photodiode (PD), adjusting the first electrical signal based on the transmission parameter of the PD to obtain a third electrical signal indicating an electrical signal transformed by the PD from the first optical signal transmitted by the LD, and subtracting the third electrical signal from a second electrical signal output by the PD in the optical transceiver module, an electrical signal generated by the optical signal transmitted by the LD and reflected or refracted to the PD is removed from the electrical signal output by the PD, thereby suppressing crosstalk and improving the sensitivity of the optical transceiver module.

4 Claims, 8 Drawing Sheets

(56) References Cited

U.S. PATENT DOCUMENTS

| | | | |
|---|---|---|---|
| 8,971,717 B1* | 3/2015 | Joffe | H04B 10/071 398/135 |
| 9,350,398 B2* | 5/2016 | Kpodzo | H04B 1/1027 |
| 2005/0089326 A1* | 4/2005 | Regev | H04B 10/0775 398/32 |
| 2006/0145051 A1 | 7/2006 | Kawai et al. | |
| 2007/0237270 A1* | 10/2007 | Mezer | H04B 3/23 375/346 |
| 2008/0095283 A1* | 4/2008 | Shoor | H04L 25/03038 375/350 |
| 2008/0239939 A1* | 10/2008 | Parnaby | H04B 3/23 370/201 |
| 2011/0217045 A1* | 9/2011 | Watson | G02B 6/12002 398/79 |
| 2013/0302031 A1* | 11/2013 | Tanimura | H04B 10/5057 398/38 |

FOREIGN PATENT DOCUMENTS

| | | | | |
|---|---|---|---|---|
| CN | 102427387 A | | 4/2012 | |
| JP | 58171138 A | * | 10/1983 | H04B 9/00 |
| WO | WO 03017534 A2 | * | 2/2003 | H04B 10/40 |
| WO | WO 2005013517 | * | 2/2005 | H04B 10/12 |
| WO | WO 2012/104982 A1 | | 8/2012 | |

* cited by examiner

CROSSTALK SUPPRESSION METHOD AND APPARATUS

CROSS-REFERENCE TO RELATED APPLICATIONS

This application is a continuation of International Application No. PCT/CN2012/087541, filed on Dec. 26, 2012, which is hereby incorporated by reference in its entirety.

TECHNICAL FIELD

The present invention relates to the field of communications technologies, and in particular, to a crosstalk suppression method and apparatus.

BACKGROUND

An optical transceiver module, integrating functions of sending and receiving optical signals, is an important component in optical communications. A laser diode (LD) in an optical transceiver module is configured to transmit an optical signal based on a received driving signal, and a photodiode (PD) in the optical transceiver module is configured to receive an optical signal sent from an external signal source, perform optical-to-electrical transformation on the optical signal sent from the external signal source, and then, output an electrical signal, so that subsequent circuits in the optical transceiver module identify, based on the electrical signal output by the PD, the optical signal sent from the external signal source.

In the prior art, a part of an optical signal transmitted by an LD based on a driving signal is reflected or refracted to a PD and becomes a crosstalk signal to an optical signal sent from an external signal source, interfering with the identification, based on an electrical signal output by the PD, of the optical signal sent from the external signal source, and reducing the sensitivity of an optical transceiver module.

SUMMARY

Embodiments of the present invention provide a crosstalk suppression method and apparatus, applicable to an optical transceiver module, so as to improve the sensitivity of the optical transceiver module.

In a first aspect, a crosstalk suppression method is provided. The method includes:

obtaining a first electrical signal, where the first electrical signal indicates a data bit stream of a first optical signal output by a laser diode LD in an optical transceiver module;

obtaining a second electrical signal output by a photodiode PD in the optical transceiver module;

adjusting the first electrical signal based on a pre-obtained transmission parameter of the PD to obtain a third electrical signal, where the third electrical signal indicates, as part of the second electrical signal, an electrical signal transformed by the PD from the first optical signal transmitted by the LD; and subtracting the third electrical signal from the second electrical signal to obtain an electrical signal transformed by the PD from an optical signal output from an external signal source.

In a first possible implementation manner of the first aspect, the pre-obtaining a transmission parameter of the PD includes: subtracting a test electrical signal from an electrical signal transformed by the PD from the first optical signal output by the LD to obtain a reference electrical signal, where the test electrical signal indicates the data bit stream of the first optical signal output by the LD; adjusting the delay of the test electrical signal, if a data bit stream indicated by the reference electrical signal is different from the data bit stream indicated by the test electrical signal and the amplitude of the reference electrical signal is greater than a preset amplitude threshold, until the data bit stream indicated by the test electrical signal is the same as the data bit stream indicated by the reference electrical signal, so as to obtain the transmission delay of the PD; and adjusting the amplitude of the test electrical signal, if the amplitude of the reference electrical signal is greater than the preset amplitude threshold, until the amplitude of the reference electrical signal is less than or equal to the amplitude threshold, and using a ratio of the adjusted amplitude of the test electrical signal to the original amplitude of the test electrical signal as an amplitude coefficient of the PD.

With reference to the first aspect or the first possible implementation manner of the first aspect, in a second possible implementation manner, the adjusting the first electrical signal based on the transmission parameter of the PD to obtain a third electrical signal includes: adjusting the amplitude and delay of the first electrical signal, respectively, based on the amplitude coefficient of the PD and the transmission delay of the PD to obtain the third electrical signal.

With reference to the first aspect, the first possible implementation manner of the first aspect, and the second possible implementation manner of the first aspect, in a third possible implementation manner, the obtaining a first electrical signal includes: receiving a driving signal for driving the LD to output the first optical signal and obtaining the first electrical signal based on the driving signal; or receiving the first optical signal output by the LD and performing optical-to-electrical transformation on the received first optical signal to obtain the first electrical signal.

With reference to the first aspect, the first possible implementation manner of the first aspect, the second possible implementation manner of the first aspect, and the third possible implementation manner of the first aspect, in a fourth possible implementation manner, the receiving the first optical signal output by the LD and performing optical-to-electrical transformation on the received first optical signal to obtain the first electrical signal includes: receiving the first optical signal output by the LD, performing optical-to-electrical transformation on the received first optical signal, and amplifying an electrical signal obtained through the optical-to-electrical transformation to obtain the first electrical signal.

With reference to the first aspect, the first possible implementation manner of the first aspect, the second possible implementation manner of the first aspect, the third possible implementation manner of the first aspect, and the fourth possible implementation manner of the first aspect, in a fifth possible implementation manner, the obtaining a second electrical signal output by a photodiode PD in the optical transceiver module includes: receiving an electrical signal output by the photodiode PD in the optical transceiver module, and amplifying the electrical signal to obtain the second electrical signal.

In a second aspect, a crosstalk suppression apparatus is provided. The apparatus includes:

a first obtaining module, configured to obtain a first electrical signal, where the first electrical signal indicates a data bit stream of a first optical signal output by a laser diode LD in an optical transceiver module;

a second obtaining module, configured to obtain a second electrical signal output by a photodiode PD in the optical transceiver module;

an adjusting module, configured to adjust the first electrical signal based on a pre-obtained transmission parameter of the PD to obtain a third electrical signal, where the third electrical signal indicates, as part of the second electrical signal, an electrical signal transformed by the PD from the first optical signal transmitted by the LD; and a third obtaining module, configured to subtract the third electrical signal from the second electrical signal to obtain an electrical signal transformed by the PD from an optical signal output from an external signal source.

In a first possible implementation manner of the second aspect, the crosstalk suppress ion apparatus further includes a fourth obtaining module, configured to pre-obtain the transmission parameter of the PD, where the fourth obtaining module includes: a reference electrical signal obtaining unit, configured to subtract a test electrical signal from an electrical signal transformed by the PD from the first optical signal output by the LD to obtain a reference electrical signal, where the test electrical signal indicates the data bit stream of the first optical signal output by the LD; a transmission delay obtaining unit, configured to adjust the delay of the test electrical signal, if a data bit stream indicated by the reference electrical signal is different from the data bit stream indicated by the test electrical signal and the amplitude of the reference electrical signal is greater than a preset amplitude threshold, until the data bit stream indicated by the test electrical signal is the same as the data bit stream indicated by the reference electrical signal, so as to obtain the transmission delay of the PD; and an amplitude coefficient obtaining unit, configured to adjust the amplitude of the test electrical signal, if the amplitude of the reference electrical signal is greater than the preset amplitude threshold, until the amplitude of the reference electrical signal is less than or equal to the amplitude threshold, and use a ratio of the adjusted amplitude of the test electrical signal to the original amplitude of the test electrical signal as an amplitude coefficient of the PD.

With reference to the second aspect or the first possible implementation manner of the second aspect, in a second possible implementation manner, the adjusting module is specifically configured to adjust the amplitude and delay of the first electrical signal, respectively, based on the amplitude coefficient of the PD and the transmission delay of the PD to obtain the third electrical signal.

With reference to the second aspect, the first possible implementation manner of the second aspect, and the second possible implementation manner of the second aspect, in a third possible implementation manner, the first obtaining module is specifically configured to receive a driving signal for driving the LD to output the first optical signal and obtain the first electrical signal based on the driving signal; or the first obtaining module is specifically configured to receive the first optical signal output by the LD and perform optical-to-electrical transformation on the received first optical signal to obtain the first electrical signal.

With reference to the second aspect, the first possible implementation manner of the second aspect, the second possible implementation manner of the second aspect, and the third possible implementation manner of the second aspect, in a fourth possible implementation manner, the first obtaining module is specifically configured to receive the first optical signal output by the LD, perform optical-to-electrical transformation on the received first optical signal, and amplify an electrical signal obtained through the optical-to-electrical transformation to obtain the first electrical signal.

With reference to the second aspect, the first possible implementation manner of the second aspect, the second possible implementation manner of the second aspect, the third possible implementation manner of the second aspect, and the fourth possible implementation manner of the second aspect, in a fifth possible implementation manner, the second obtaining module is specifically configured to receive an electrical signal output by the photodiode PD in the optical transceiver module, and amplify the electrical signal to obtain the second electrical signal.

In a third aspect, a crosstalk suppression apparatus is provided. The apparatus includes:

a memory, configured to store programs; and a processor, executing the programs, and configured to: obtain a first electrical signal, where the first electrical signal indicates a data bit stream of a first optical signal output by a laser diode LD in an optical transceiver module; obtain a second electrical signal output by a photodiode PD in the optical transceiver module; adjust the first electrical signal based on a pre-obtained transmission parameter of the PD to obtain a third electrical signal, where the third electrical signal indicates, as part of the second electrical signal, an electrical signal transformed by the PD from the first optical signal transmitted by the LD; and subtract the third electrical signal from the second electrical signal to obtain an electrical signal transformed by the PD from an optical signal output from an external signal source.

In a first possible implementation manner of the third aspect, the processor is further configured to: subtract a test electrical signal from an electrical signal transformed by the PD from the first optical signal output by the LD to obtain a reference electrical signal, where the test electrical signal indicates the data bit stream of the first optical signal output by the LD; adjust the delay of the test electrical signal, if a data bit stream indicated by the reference electrical signal is different from the data bit stream indicated by the test electrical signal and the amplitude of the reference electrical signal is greater than a preset amplitude threshold, until the data bit stream indicated by the test electrical signal is the same as the data bit stream indicated by the reference electrical signal, so as to obtain the transmission delay of the PD; and adjust the amplitude of the test electrical signal, if the amplitude of the reference electrical signal is greater than the preset amplitude threshold, until the amplitude of the reference electrical signal is less than or equal to the amplitude threshold, and use a ratio of the adjusted amplitude of the test electrical signal to the original amplitude of the test electrical signal as an amplitude coefficient of the PD.

With reference to the third aspect or the first possible implementation manner of the third aspect, in a second possible implementation manner, the processor is specifically configured to adjust the amplitude and delay of the first electrical signal, respectively, based on the amplitude coefficient of the PD and the transmission delay of the PD to obtain the third electrical signal.

With reference to the third aspect, the first possible implementation manner of the third aspect, and the second possible implementation manner of the third aspect, in a third possible implementation manner, the crosstalk suppression apparatus further includes a communication interface, configured to receive a driving signal for driving the LD to output the first optical signal, where the processor is specifically configured to obtain the first electrical signal based on the driving signal; or a communication interface, configured to receive the first optical signal output by the LD, where the processor is specifically configured to perform optical-to-electrical transformation on the received first optical signal to obtain the first electrical signal.

With reference to the third aspect, the first possible implementation manner of the third aspect, the second possible implementation manner of the third aspect, and the third possible implementation manner of the third aspect, in a fourth possible implementation manner, the processor is specifically configured to perform optical-to-electrical transformation on the received first optical signal, and amplify an electrical signal obtained through the optical-to-electrical transformation to obtain the first electrical signal.

With reference to the third aspect, the first possible implementation manner of the third aspect, the second possible implementation manner of the third aspect, the third possible implementation manner of the third aspect, and the fourth possible implementation manner of the third aspect, in a fifth possible implementation manner, the communication interface is further configured to receive an electrical signal output by the photodiode PD in the optical transceiver module; and the processor is specifically configured to amplify the electrical signal to obtain the second electrical signal.

According to a crosstalk suppression method and apparatus in the embodiments of the present invention, a first electrical signal indicating a data bit stream of a first optical signal output by a laser diode in an optical transceiver module, a second electrical signal output by a photodiode in the optical transceiver module, and a transmission parameter of the photodiode are obtained, the first electrical signal is adjusted based on the transmission parameter of the photodiode to obtain a third electrical signal indicating an electrical signal transformed by the photodiode from the first optical signal transmitted by the laser diode, and the third electrical signal is subtracted from the second electrical signal, thereby suppressing crosstalk and improving the sensitivity of the optical transceiver module.

BRIEF DESCRIPTION OF THE DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
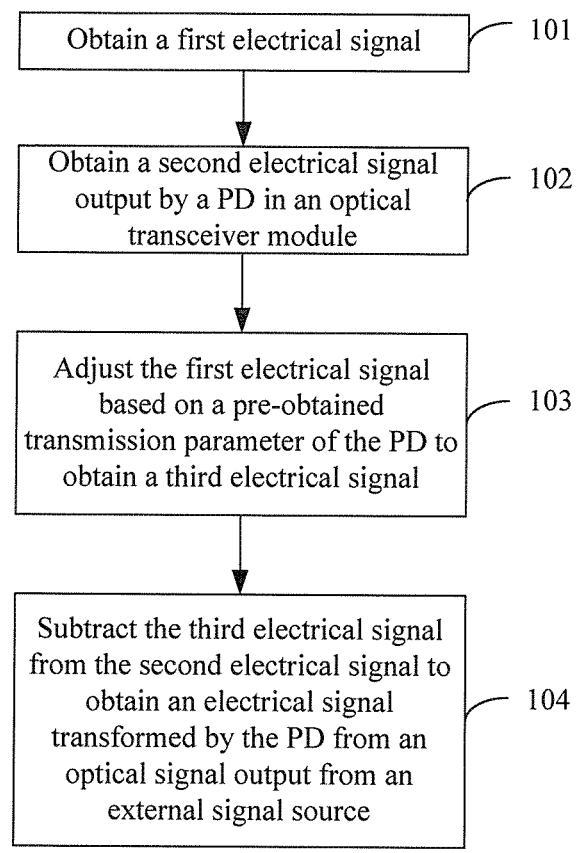
FIG. 1 is a schematic flow chart of a crosstalk suppression method according to an embodiment of the present invention.

FIG. 1 is a schematic flow chart of a crosstalk suppression method according to an embodiment of the present invention. As shown in FIG. 1, this embodiment may include:

101: Obtain a first electrical signal, where the first electrical signal indicates a data bit stream of a first optical signal output by an LD in an optical transceiver module.

The LD in the optical transceiver module transmits the first optical signal based on a driving signal, where the first optical signal and the driving signal indicate the same data bit stream.

Optionally, the driving signal for driving the LD to output the first optical signal is received, and the first electrical signal is obtained based on the driving signal.

Optionally, the first optical signal output by the LD is received, and optical-to-electrical transformation is performed on the received first optical signal to obtain the first electrical signal.

Optionally, the first optical signal output by the LD is received, optical-to-electrical transformation is performed on the received first optical signal, and an electrical signal obtained through the optical-to-electrical transformation is amplified to obtain the first electrical signal.

102: Obtain a second electrical signal output by a PD in the optical transceiver module.

The PD in the optical transceiver module receives a second optical signal sent from an external signal source and outputs the second electrical signal after performing optical-to-electrical transformation on the second optical signal sent from the external signal source. In this process, the first optical signal output by the LD is reflected or refracted to the PD. Therefore, the second electrical signal output by the PD includes both an electrical signal generated by the second optical signal and an electrical signal generated by the first optical signal reflected or refracted to the PD.

Optionally, an electrical signal output by the PD in the optical transceiver module may be directly received as the second electrical signal.

Optionally, an electrical signal output by the photodiode PD in the optical transceiver module may be received, and the electrical signal may be amplified to obtain the second electrical signal.

103: Adjust the first electrical signal based on a pre-obtained transmission parameter of the PD to obtain a third electrical signal.

The third electrical signal indicates, as part of the second electrical signal, an electrical signal transformed by the PD from the first optical signal transmitted by the LD.

The transmission parameter of the PD includes but is not limited to: the transmission delay of the PD and an amplitude coefficient of the PD. Optionally, the process of pre-obtaining the transmission parameter of the PD may include: subtracting a test electrical signal from an electrical signal transformed by the PD from the first optical signal output by the LD to obtain a reference electrical signal, where the test electrical signal indicates the data bit stream of the first optical signal output by the LD. The delay of the test electrical signal is adjusted, if a data bit stream indicated by the reference electrical signal is different from the data bit stream indicated by the test electrical signal and the amplitude of the reference electrical signal is greater than a preset amplitude threshold, until the data bit stream indicated by the test electrical signal is the same as the data bit stream indicated by the reference electrical signal, so as to obtain the transmission delay of the PD. The amplitude of the test electrical signal is adjusted, if the amplitude of the reference electrical signal is greater than the preset amplitude threshold, until the amplitude of the reference electrical signal is less than or equal to the amplitude threshold, and a ratio of the adjusted amplitude of the test electrical signal to the original amplitude of the test electrical signal is used as the amplitude coefficient of the PD.

Based on the above, an optional implementation manner of step 103 includes: adjusting the amplitude and delay of the first electrical signal, respectively, based on the amplitude coefficient of the PD and the transmission delay of the PD to obtain the third electrical signal.

104: Subtract the third electrical signal from the second electrical signal to obtain an electrical signal transformed by the PD from an optical signal output from an external signal source.

According to this embodiment, by obtaining a first electrical signal indicating a data bit stream of a first optical signal output by a laser diode in an optical transceiver module and a transmission parameter of a photodiode, adjusting the first electrical signal based on the transmission parameter of the photodiode to obtain a third electrical signal indicating an electrical signal transformed by the photodiode from the first optical signal transmitted by the laser diode, and subtracting the third electrical signal from a second electrical signal output by the photodiode in the optical transceiver module, an electrical signal generated by the optical signal transmitted by the LD and reflected or refracted to the PD is removed from the electrical signal output by the PD, thereby suppressing crosstalk and improving the sensitivity of the optical transceiver module.

Figure 2:
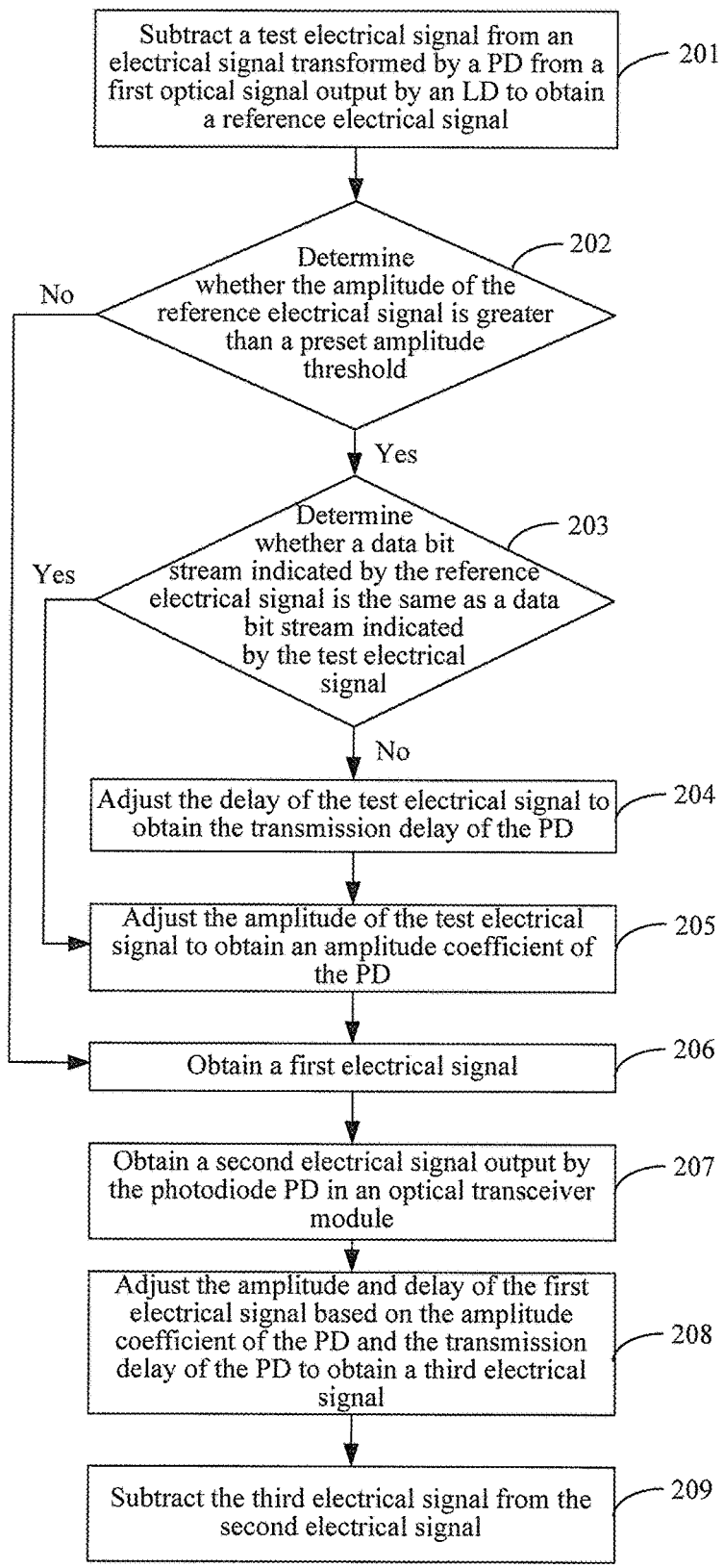
FIG. 2 is a schematic flow chart of a crosstalk suppression method according to another embodiment of the present invention.

FIG. 2 is a schematic flow chart of a crosstalk suppression method according to another embodiment of the present invention. As shown in FIG. 2, this embodiment may include:

201: Subtract a test electrical signal from an electrical signal transformed by a PD from a first optical signal output by an LD to obtain a reference electrical signal.

The test electrical signal indicates a data bit stream of the first optical signal output by the LD.

202: Determine whether the amplitude of the reference electrical signal is greater than a preset amplitude threshold. If yes, perform 203; or if not, perform 206.

203: Determine whether a data bit stream indicated by the reference electrical signal is the same as a data bit stream indicated by the test electrical signal. If not, perform 204; or if yes, perform 205.

204: Adjust the delay of the test electrical signal to obtain the transmission delay of the PD.

The delay of the test electrical signal is adjusted, if the data bit stream indicated by the reference electrical signal is different from the data bit stream indicated by the test electrical signal and the amplitude of the reference electrical signal is greater than the preset amplitude threshold, until the data bit stream indicated by the test electrical signal is the same as the data bit stream indicated by the reference electrical signal, so as to obtain the transmission delay of the PD.

It should be noted that delay adjustment includes an increase or a decrease of the delay.

205: Determine that the transmission delay of the PD is 0, and then, adjust the amplitude of the test electrical signal to obtain an amplitude coefficient of the PD.

The amplitude of the test electrical signal is adjusted, if the amplitude of the reference electrical signal is greater than the preset amplitude threshold, until the amplitude of the reference electrical signal is less than or equal to the amplitude threshold, and a ratio of the adjusted amplitude of the test electrical signal to the original amplitude of the test electrical signal is used as the amplitude coefficient of the PD.

It should be noted that, the amplitude adjustment includes an increase of the amplitude, that is, a gain, or a decrease of the amplitude, that is, attenuation.

206: Determine that the transmission delay of the PD is 0, and the amplitude coefficient of the PD is 1, and then, obtain a first electrical signal.

Figure 3:
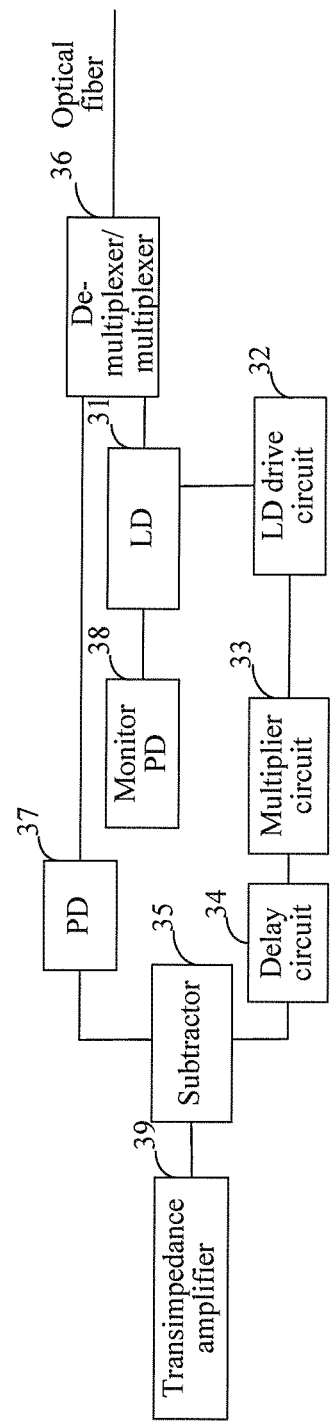
FIG. 3 is a schematic circuit diagram for implementing a crosstalk suppression method according to another embodiment of the present invention.

Optionally, a driving signal for driving the LD to output the first optical signal is received, and the first electrical signal is obtained based on the driving signal. FIG. 3 is a schematic circuit diagram for implementing a crosstalk suppression method according to this embodiment. As shown in FIG. 3, an LD 31, an LD drive circuit 32, a multiplier circuit 33, a delay circuit 34, and a subtractor 35 are connected in turn, the LD 31 is connected to a monitor PD 38 and a de-multiplexer/multiplexer 36, respectively, a PD 37 is connected to the subtractor 35 and the de-multiplexer/multiplexer 36, respectively, and the subtractor 35 is connected to a transimpedance amplifier 39. A driving signal output by the LD drive circuit 32 for driving the LD to output the first optical signal is received to obtain the first electrical signal, so that the multiplier circuit 33 and delay circuit 34 adjust the amplitude and delay of the first electrical signal to obtain a third electrical signal, and the subtractor 35 is used to subtract the third electrical signal from a second electrical signal output by the PD 37, and provide the subtracted electrical signal for the transimpedance amplifier 39.

Figure 4:
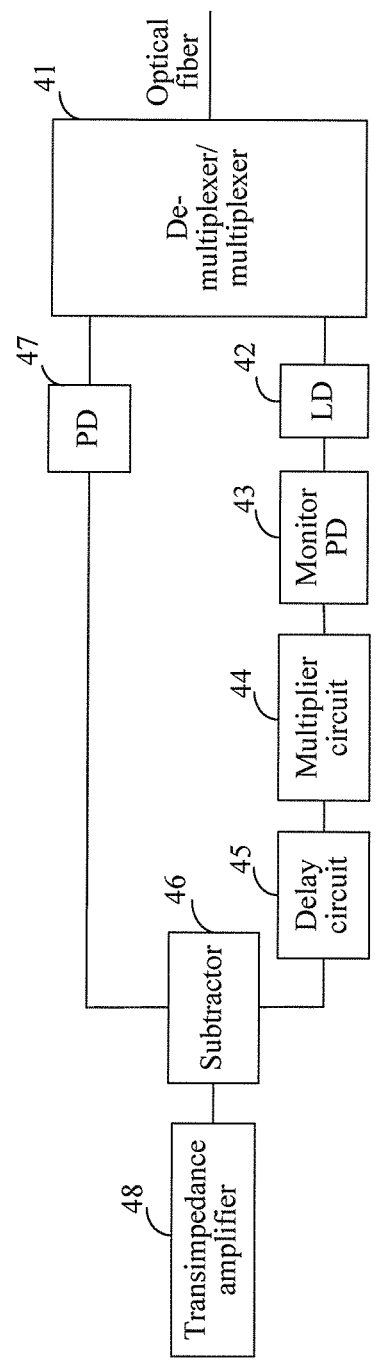
FIG. 4 is another schematic circuit diagram for implementing a crosstalk suppression method according to another embodiment of the present invention.

Optionally, the first optical signal output by the LD is received, and optical-to-electrical transformation is performed on the received first optical signal to obtain the first electrical signal. FIG. 4 is another schematic circuit diagram for implementing a crosstalk suppression method according to this embodiment. As shown in FIG. 4, a de-multiplexer/multiplexer 41, an LD 42, a monitor PD 43, a multiplier circuit 44, a delay circuit 45, and a subtractor 46 are connected in turn, a PD 47 is connected to the subtractor 46 and the de-multiplexer/multiplexer 41, respectively, and the subtractor 46 is connected to a transimpedance amplifier 48. The monitor PD 43 is used to receive a first optical signal output by the LD 42, and perform optical-to-electrical transformation on the received first optical signal to obtain the first electrical signal, so that the multiplier circuit 44 and delay circuit 45 adjust the amplitude and delay of the first electrical signal to obtain the third electrical signal, and the subtractor 46 is used to subtract the third electrical signal from a second electrical signal output by the PD 47, and provide the subtracted electrical signal for the transimpedance amplifier 48.

207: Obtain a second electrical signal output by the photodiode PD in an optical transceiver module.

The PD in the optical transceiver module receives a second optical signal sent from an external signal source and outputs the second electrical signal after performing optical-to-electrical transformation on the second optical signal sent from the external signal source. In this process, the first optical signal output by the LD is reflected or refracted to the PD. Therefore, the second electrical signal output by the PD includes both an electrical signal generated by the second optical signal and an electrical signal generated by the first optical signal reflected or refracted to the PD.

208: Adjust the amplitude and delay of the first electrical signal based on the amplitude coefficient of the PD and the transmission delay of the PD to obtain a third electrical signal.

The third electrical signal indicates, as part of the second electrical signal, an electrical signal transformed by the PD from the first optical signal transmitted by the LD.

Based on the amplitude coefficient of the PD, a multiplier circuit is used to adjust the amplitude of the first electrical signal, and based on the transmission delay of the PD, a delay circuit is used to adjust the delay of the first electrical signal, so that the third electrical signal is the same as, in the second electrical signal, the electrical signal transformed by the PD from the first optical signal transmitted by the LD.

For example, $\alpha$ is marked as the amplitude coefficient of the PD, $\delta t$ is marked as the transmission delay of the PD, $I_1$ is marked as the first electrical signal, and $I_3$ is marked as the third electrical signal. The multiplier circuit is used to adjust the amplitude of the first electrical signal, and the delay circuit is used to adjust the delay of the first electrical signal, respectively, and the obtained third electrical signal $I_3 = \alpha I_1 (\delta t)$, so that the third electrical signal has the same amplitude and transmission delay as, in the second electrical signal, the electrical signal transformed by the PD from the first optical signal transmitted by the LD.

209: Subtract the third electrical signal from the second electrical signal.

A subtractor is used to subtract the third electrical signal from the second electrical signal to obtain an electrical signal transformed by the PD from an optical signal output from an external signal source, and provide the electrical signal for a transimpedance amplifier (TIA) to be amplified, and then, provide the amplified electrical signal for a limiting amplifier (LA).

According to this embodiment, by obtaining a first electrical signal indicating a data bit stream of a first optical signal output by a laser diode in an optical transceiver module and a transmission parameter of a photodiode, adjusting the first electrical signal based on the transmission parameter of the photodiode to obtain a third electrical signal indicating an electrical signal transformed by the photodiode from the first optical signal transmitted by the laser diode, and subtracting the third electrical signal from a second electrical signal output by the photodiode in the optical transceiver module, an electrical signal generated by the optical signal transmitted by the LD and reflected or refracted to the PD is removed from the electrical signal output by the PD, thereby suppressing crosstalk and improving the sensitivity of the optical transceiver module.

Figure 5:
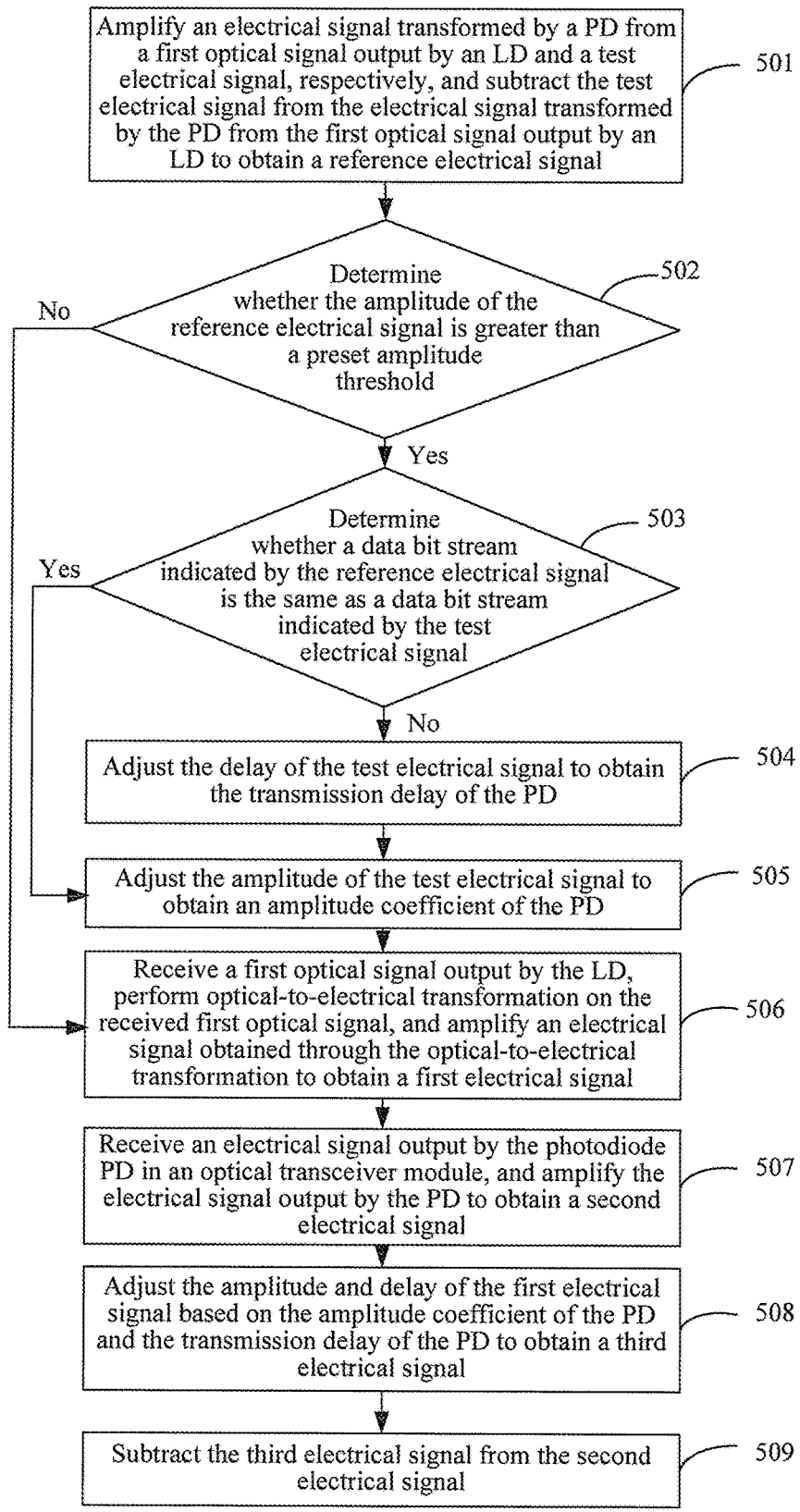
FIG. 5 is a schematic flow chart of a crosstalk suppression method according to another embodiment of the present invention.

FIG. 5 is a schematic flow chart of a crosstalk suppression method according to another embodiment of the present invention. As shown in FIG. 5, this embodiment may include:

501: Amplify an electrical signal transformed by a PD from a first optical signal output by an LD and a test electrical signal, respectively, and subtract the test electrical signal from the electrical signal transformed by the PD from the first optical signal output by the LD to obtain a reference electrical signal.

The test electrical signal indicates a data bit stream of the first optical signal output by the LD.

A TIA is used to amplify the electrical signal transformed by the PD from the first optical signal output by the LD and a test electrical signal output by a monitor PD, respectively, and subtract the test electrical signal from the electrical signal to obtain the reference electrical signal.

502: Determine whether the amplitude of the reference electrical signal is greater than a preset amplitude threshold. If yes, perform 503; or if not, perform 506.

503: Determine whether a data bit stream indicated by the reference electrical signal is the same as a data bit stream indicated by the test electrical signal. If not, perform 504; or if yes, perform 505.

504: Adjust the delay of the test electrical signal to obtain the transmission delay of the PD.

505: Determine that the transmission delay of the PD is 0, and then, adjust the amplitude of the test electrical signal to obtain an amplitude coefficient of the PD.

502 to 505 are the same as 202 to 205 in the preceding embodiment, and the details are not described herein again.

506: Determine that the transmission delay of the PD is 0 and the amplitude coefficient of the PD is 1, then, receive the first optical signal output by the LD, perform optical-to-electrical transformation on the received first optical signal, and amplify an electrical signal obtained through the optical-to-electrical transformation to obtain a first electrical signal.

Figure 6:
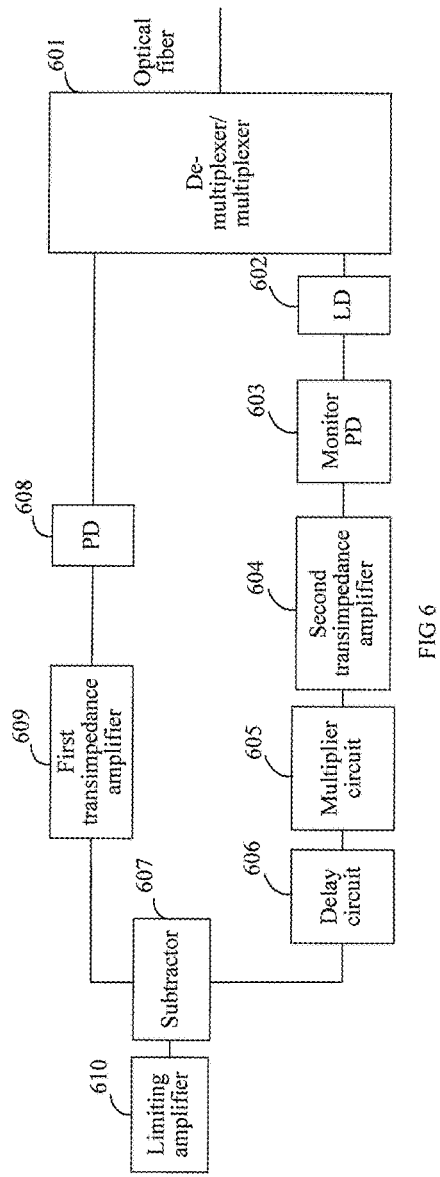
FIG. 6 is still another schematic circuit diagram for implementing a crosstalk suppression method according to another embodiment of the present invention.

FIG. 6 is still another schematic circuit diagram for implementing a crosstalk suppression method according to this embodiment. As shown in FIG. 6, a de-multiplexer/multiplexer 601, an LD 602, a monitor PD 603, a second TIA 604, a multiplier circuit 605, a delay circuit 606, and a subtractor 607 are connected in turn, the de-multiplexer/multiplexer 601, a PD 608, a first TIA 609, and a subtractor 607 are connected in turn, and the subtractor 607 is connected to a limiting amplifier 610 (LA). The monitor PD 603 is used to receive a first optical signal output by the LD 602, perform optical-to-electrical transformation on the received first optical signal, the second TIA 604 is used to amplify an electrical signal obtained through the optical-to-electrical transformation to obtain the first electrical signal, so that the multiplier circuit 605 and delay circuit 606 adjust the amplitude and delay of the first electrical signal to obtain a third electrical signal, the subtractor 607 subtracts the third electrical signal from a second electrical signal amplified by the first TIA 609 and then output by the PD 608, and provides the subtracted electrical signal for the limiting amplifier 610.

507: Receive an electrical signal output by the photodiode PD in an optical transceiver module, and amplify the electrical signal output by the PD to obtain a second electrical signal.

The electrical signal output by the PD is received, a first TIA is used to amplify the electrical signal output by the PD to obtain the second electrical signal, a subtractor is used to subtract the third electrical signal from the second electrical signal, and provide the subtracted electrical signal for a limiting amplifier.

508: Adjust the amplitude and delay of the first electrical signal based on the amplitude coefficient of the PD and the transmission delay of the PD to obtain a third electrical signal.

The third electrical signal indicates, as part of the second electrical signal, an electrical signal transformed by the PD from the first optical signal transmitted by the LD.

Based on the amplitude coefficient of the PD, a multiplier circuit is used to adjust the amplitude of the first electrical signal, and based on the transmission delay of the PD, a delay circuit is used to adjust the delay of the first electrical signal, so that the third electrical signal is the same as, in the second electrical signal, the electrical signal transformed by the PD from the first optical signal transmitted by the LD.

509: Subtract the third electrical signal from the second electrical signal.

A subtractor is used to subtract the third electrical signal from the second electrical signal to obtain an electrical signal transformed by the PD from an optical signal output from an external signal source, and provide the electrical signal for the limiting amplifier.

According to this embodiment, by obtaining a first electrical signal indicating a data bit stream of a first optical signal output by a laser diode in an optical transceiver module and a transmission parameter of a photodiode, adjusting the first electrical signal based on the transmission parameter of the photodiode to obtain a third electrical signal indicating an electrical signal transformed by the photodiode from the first optical signal transmitted by the laser diode, and subtracting the third electrical signal from a second electrical signal output by the photodiode in the optical transceiver module, an electrical signal generated by the optical signal transmitted by the LD and reflected or refracted to the PD is removed from the electrical signal output by the PD, thereby suppressing crosstalk and improving the sensitivity of the optical transceiver module. Furthermore, by receiving the first optical signal output by the laser diode, amplifying an electrical signal obtained by performing optical-to-electrical transformation on the received first optical signal to obtain the first electrical signal, and amplifying the electrical signal output by the photodiode to obtain the second electrical signal, the precision of crosstalk suppression is improved, thereby further improving the sensitivity of the optical transceiver module.

Figure 7:
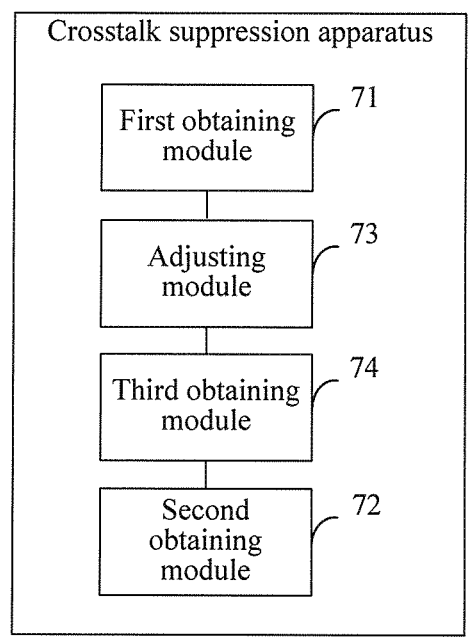
FIG. 7 is a schematic structural diagram of a crosstalk suppression apparatus according to another embodiment of the present invention.

FIG. 7 is a schematic structural diagram of a crosstalk suppression apparatus according to another embodiment of the present invention. As shown in FIG. 7, this embodiment may include: a first obtaining module 71, a second obtaining module 72, an adjusting module 73, and a third obtaining module 74.

The first obtaining module 71 is configured to obtain a first electrical signal, where the first electrical signal indicates a data bit stream of a first optical signal output by an LD in an optical transceiver module.

Optionally, the first obtaining module 71 is specifically configured to receive a driving signal for driving the LD to output the first optical signal, and obtain the first electrical signal based on the driving signal.

Optionally, the first obtaining module 71 is specifically configured to receive the first optical signal output by the LD, and perform optical-to-electrical transformation on the received first optical signal to obtain the first electrical signal.

Optionally, the first obtaining module 71 is specifically configured to receive the first optical signal output by the LD, perform optical-to-electrical transformation on the received first optical signal, and amplify an electrical signal obtained through the optical-to-electrical transformation to obtain the first electrical signal.

The second obtaining module 72 is configured to obtain a second electrical signal output by a PD in the optical transceiver module.

Optionally, the second obtaining module 72 is specifically configured to receive an electrical signal output by the PD in the optical transceiver module, and amplify the electrical signal to obtain the second electrical signal.

The adjusting module 73, connected to the first obtaining module 71, is configured to adjust the first electrical signal based on a pre-obtained transmission parameter of the PD to obtain a third electrical signal, where the third electrical signal indicates, as part of the second electrical signal, an electrical signal transformed by the PD from the first optical signal transmitted by the LD.

The transmission parameter of the PD includes an amplitude coefficient of the PD and the transmission delay of the PD.

Optionally, the adjusting module 73 is specifically configured to adjust the amplitude and delay of the first electrical signal, respectively, based on the amplitude coefficient of the PD and the transmission delay of the PD to obtain the third electrical signal.

The third obtaining module 74, connected to the second obtaining module 72 and the adjusting module 73, is configured to subtract the third electrical signal from the second electrical signal to obtain an electrical signal transformed by the PD from an optical signal output from an external signal source.

The functional modules of the crosstalk suppression apparatus according to this embodiment may be configured to execute the process of the crosstalk suppression method shown in FIG. 1. The detailed working principles of the modules are not described herein again, and reference is made to the descriptions in the method embodiment.

According to this embodiment, by obtaining a first electrical signal indicating a data bit stream of a first optical signal output by a laser diode in an optical transceiver module and a transmission parameter of a photodiode, adjusting the first electrical signal based on the transmission parameter of the photodiode to obtain a third electrical signal indicating an electrical signal transformed by the photodiode from the first optical signal transmitted by the laser diode, and subtracting the third electrical signal from a second electrical signal output by the photodiode in the optical transceiver module, an electrical signal generated by the optical signal transmitted by the LD and reflected or refracted to the PD is removed from the electrical signal output by the PD, thereby suppressing crosstalk and improving the sensitivity of the optical transceiver module. Furthermore, by receiving the first optical signal output by the laser diode, performing optical-to-electrical transformation on the received first optical signal, amplifying an electrical signal obtained through the optical-to-electrical transformation to obtain the first electrical signal, and amplifying the electrical signal output by the photodiode to obtain the second electrical signal, the precision of crosstalk suppression is improved, thereby further improving the sensitivity of the optical transceiver module.

Figure 8:
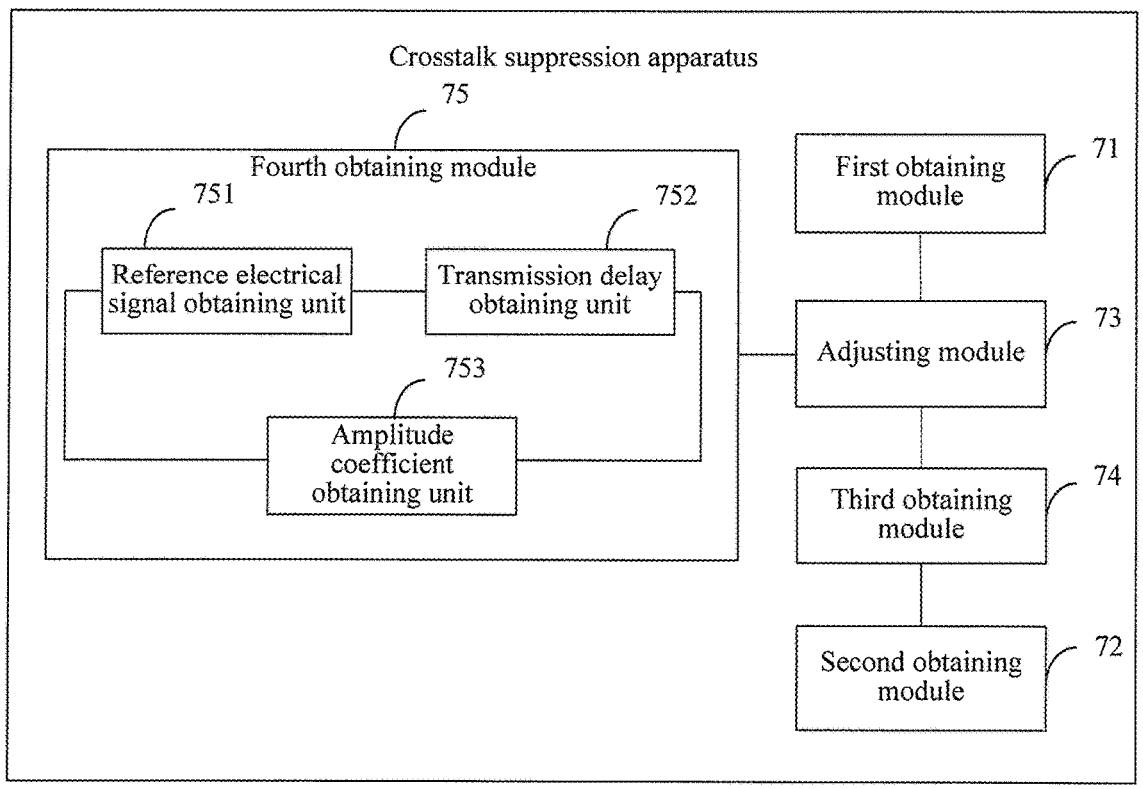
FIG. 8 is a schematic structural diagram of a crosstalk suppression apparatus according to another embodiment of the present invention.

FIG. 8 is a schematic structural diagram of a crosstalk suppression apparatus according to another embodiment of the present invention. As shown in FIG. 8, on the basis of the preceding embodiment, this embodiment further includes a fourth obtaining module 75.

The fourth obtaining module is configured to pre-obtain the transmission parameter of the PD.

Furthermore, the fourth obtaining module 75 includes: a reference electrical signal obtaining unit 751, a transmission delay obtaining unit 752, and an amplitude coefficient obtaining unit 753.

The reference electrical signal obtaining unit 751 is configured to subtract a test electrical signal from an electrical signal transformed by the PD from the first optical signal output by the LD to obtain a reference electrical signal, where the test electrical signal indicates the data bit stream of the first optical signal output by the LD.

The transmission delay obtaining unit 752, connected to the reference electrical signal obtaining unit 751, is configured to adjust the delay of the test electrical signal, if a data bit stream indicated by the reference electrical signal is different from the data bit stream indicated by the test electrical signal and the amplitude of the reference electrical signal is greater than a preset amplitude threshold, until the data bit stream indicated by the test electrical signal is the same as the data bit stream indicated by the reference electrical signal, so as to obtain the transmission delay of the PD.

The amplitude coefficient obtaining unit 753, connected to the reference electrical signal obtaining unit 751 and the transmission delay obtaining unit 752, is configured to adjust the amplitude of the test electrical signal, if the amplitude of the reference electrical signal is greater than the preset amplitude threshold, until the amplitude of the reference electrical signal is less than or equal to the amplitude threshold, and use a ratio of the adjusted amplitude of the test electrical signal to the original amplitude of the test electrical signal as the amplitude coefficient of the PD.

The functional modules of the crosstalk suppression apparatus according to this embodiment may be configured to execute the process of the crosstalk suppression methods shown in FIG. 2 and FIG. 5. The detailed working principles of the modules are not described herein again, and reference is made to the descriptions in the method embodiments.

According to this embodiment, by obtaining a first electrical signal indicating a data bit stream of a first optical signal output by a laser diode in an optical transceiver module and a transmission parameter of a photodiode, adjusting the first electrical signal based on the transmission parameter of the photodiode to obtain a third electrical signal indicating an electrical signal transformed by the photodiode from the first optical signal transmitted by the laser diode, and subtracting the third electrical signal from a second electrical signal output by the photodiode in the optical transceiver module, an electrical signal generated by the optical signal transmitted by the LD and reflected or refracted to the PD is removed from the electrical signal output by the PD, thereby suppressing crosstalk and improving the sensitivity of the optical transceiver module.

Figure 9:
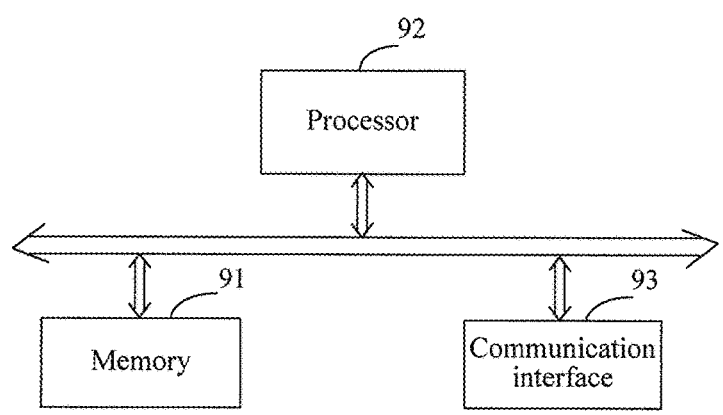
FIG. 9 is a schematic structural diagram of a crosstalk suppression apparatus according to another embodiment of the present invention.

FIG. 9 is a schematic structural diagram of a crosstalk suppression apparatus according to another embodiment of the present invention. As shown in FIG. 9, this embodiment may include a memory 91 and a processor 92.

The memory 91 is configured to store programs. Specifically, a program may include program codes, where the program codes include computer operation instructions. The memory 91 may include a high-speed RAM memory, and may also include a non-volatile memory, for example, at least one magnetic disk memory.

The processor 92, configured to execute the programs stored in the memory 91, and configured to: obtain a first electrical signal, where the first electrical signal indicates a data bit stream of a first optical signal output by a laser diode LD in an optical transceiver module; obtain a second electrical signal output by a photodiode PD in the optical transceiver module; adjust the first electrical signal based on a pre-obtained transmission parameter of the PD to obtain a third electrical signal, where the third electrical signal indicates, as part of the second electrical signal, an electrical signal transformed by the PD from the first optical signal transmitted by the LD; and subtract the third electrical signal from the second electrical signal to obtain an electrical signal transformed by the PD from an optical signal output from an external signal source.

Furthermore, the processor is further configured to: subtract a test electrical signal from an electrical signal transformed by the PD from the first optical signal output by the LD to obtain a reference electrical signal, where the test electrical signal indicates the data bit stream of the first optical signal output by the LD; adjust the delay of the test electrical signal, if a data bit stream indicated by the reference electrical signal is different from the data bit stream indicated by the test electrical signal and the amplitude of the reference electrical signal is greater than a preset amplitude threshold, until the data bit stream indicated by the test electrical signal is the same as the data bit stream indicated by the reference electrical signal, so as to obtain the transmission delay of the PD; and adjust the amplitude of the test electrical signal, if the amplitude of the reference electrical signal is greater than the preset amplitude threshold, until the amplitude of the reference electrical signal is less than or equal to the amplitude threshold, and use a ratio of the adjusted amplitude of the test electrical signal to the original amplitude of the test electrical signal as an amplitude coefficient of the PD.

Furthermore, the crosstalk suppression apparatus according to this embodiment further includes a communication interface 93.

The communication interface 93 is configured to receive a driving signal for driving the LD to output the first optical signal. In this case, the processor 92 is specifically configured to obtain the first electrical signal based on the driving signal received by the communication interface 93.

Alternatively, the communication interface 93 is configured to receive the first optical signal output by the LD. In this case, the processor 92 is specifically configured to perform optical-to-electrical transformation on the first optical signal received by the communication interface 93 to obtain the first electrical signal. Alternatively, the processor 92 is specifically configured to perform optical-to-electrical transformation on the first optical signal received by the communication interface 93, and amplify an electrical signal obtained through the optical-to-electrical transformation to obtain the first electrical signal.

Furthermore, the communication interface 93 is further configured to receive an electrical signal output by the PD in the optical transceiver module.

Optionally, the processor 92 is specifically configured to amplify the electrical signal received by the communication interface 93 and output from the PD to obtain the second electrical signal.

Optionally, in specific implementation, if the memory 91, the processor 92, and the communication interface 93 are implemented separately, the memory 91, the processor 92, and the communication interface 93 may be connected by a bus and communicate with each other. The bus may be an industry standard architecture (ISA) bus, a peripheral component interconnect (PCI) bus, an Extended Industry Standard Architecture (EISA) bus, or the like. The bus may be classified into an address bus, a data bus, a control bus, or the like. For ease of illustration, FIG. 9 uses a bidirectional arrow to indicate the bus, but it does not mean that only one bus or a single type of bus is available.

Optionally, in specific implementation, if the memory 91, the processor 92, and the communication interface 93 are implemented on one chip, the memory 91, the processor 92, and the communication interface 93 may communicate with each other through internal interfaces.

The processor 92 may be a central processing unit (CPU) or an application-specific integrated circuit (ASIC), or be configured as one or more integrated circuits according to the embodiment of the present invention.

The functional modules of the crosstalk suppression apparatus according to this embodiment may be configured to execute the process of the crosstalk suppression methods shown in FIG. 1, FIG. 2, and FIG. 5. The detailed working principles of the modules are not described herein again, and reference is made to the descriptions in the method embodiments.

According to this embodiment, by obtaining a first electrical signal indicating a data bit stream of a first optical signal output by a laser diode in an optical transceiver module and a transmission parameter of a photodiode, adjusting the first electrical signal based on the transmission parameter of the photodiode to obtain a third electrical signal indicating an electrical signal transformed by the photodiode from the first optical signal transmitted by the laser diode, and subtracting the third electrical signal from a second electrical signal output by the photodiode in the optical transceiver module, an electrical signal generated by the optical signal transmitted by the LD and reflected or refracted to the PD is removed from the electrical signal output by the PD, thereby suppressing crosstalk and improving the sensitivity of the optical transceiver module.

Persons of ordinary skill in the art may understand that all or a part of the steps in the foregoing method embodiments may be implemented by a program instructing relevant hardware. The program may be stored in a computer readable storage medium. When the program runs, the steps included in the method embodiments are performed. The storage medium may be any medium capable of storing program codes, such as a ROM, a RAM, a magnetic disk, or an optical disk.

Finally, it should be noted that, the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments or make equivalent replacements to some or all the technical features thereof, as long as these modifications or replacements do not make the essence of corresponding technical solutions depart from the scope of the technical solutions of the embodiments of the present invention.

What is claimed is:

1. A crosstalk suppression method, comprising:
   subtracting a test electrical signal from an electrical signal transformed by a photodiode (PD) in an optical transceiver module from a first optical signal output by a laser diode (LD) in the optical transceiver module to obtain a reference electrical signal, wherein the test electrical signal indicates a data bit stream of the first optical signal output by the LD;
   adjusting a delay of the test electrical signal, if a data bit stream indicated by the reference electrical signal is different from the data bit stream indicated by the test electrical signal and an amplitude of the reference electrical signal is greater than a preset amplitude threshold, until the data bit stream indicated by the test electrical signal is the same as the data bit stream indicated by the reference electrical signal, so as to obtain a transmission delay of the PD;
   adjusting an amplitude of the test electrical signal, if the amplitude of the reference electrical signal is greater than the preset amplitude threshold, until the amplitude of the reference electrical signal is less than or equal to the amplitude threshold, and using a ratio of the adjusted amplitude of the test electrical signal to the original amplitude of the test electrical signal as an amplitude coefficient of the PD;
   after adjusting the amplitude of the test electrical signal, obtaining a first electrical signal that indicates the data bit stream of the first optical signal output by the LD;
   obtaining a second electrical signal output by the PD;
   adjusting an amplitude and a delay of the first electrical signal based on the amplitude coefficient of the PD and the transmission delay of the PD, respectively, to obtain a third electrical signal that indicates, as part of the second electrical signal, an electrical signal transformed by the PD from the first optical signal transmitted by the LD;
   subtracting, by a subtractor circuit, the third electrical signal from the second electrical signal to obtain a fourth electrical signal transformed by the PD from an optical signal output from an external signal source; and
   providing the fourth electrical signal to a limiting amplifier,
   wherein obtaining the first electrical signal comprises receiving the first optical signal output by the LD at a monitoring PD, performing optical-to-electrical transformation on the received first optical signal by the monitoring PD to generate a fifth electrical signal, amplifying the fifth electrical signal at a first transimpedance amplifier to generate the first electrical signal, and receiving the first electrical signal at a multiplier circuit and a delay circuit before the amplitude and delay of the first electrical signal is adjusted, and
   wherein obtaining the second electrical signal output by the PD comprises receiving an electrical signal output by the PD and amplifying the received electrical signal at a second transimpedance amplifier to generate the second electrical signal before subtracting the third electrical signal from the second electrical signal.

2. A crosstalk suppression apparatus, comprising:
   a first obtaining module, configured to obtain a first electrical signal, wherein the first electrical signal indicates a data bit stream of a first optical signal output by a laser diode (LD) in an optical transceiver module;

a second obtaining module, configured to obtain a second electrical signal output by a photodiode (PD) in the optical transceiver module;

an adjusting module, configured to adjust an amplitude and delay of the first electrical signal based on a pre-obtained transmission parameter of the PD to obtain a third electrical signal, wherein the third electrical signal indicates, as part of the second electrical signal, an electrical signal transformed by the PD from the first optical signal transmitted by the LD;

a third obtaining module comprising a subtractor circuit, configured to subtract the third electrical signal from the second electrical signal to obtain a fourth electrical signal transformed by the PD from an optical signal output from an external signal source, and provide the fourth electrical signal to a limiting amplifier; and a fourth obtaining module, configured to pre-obtain the transmission parameter of the PD, the fourth obtaining module comprising:

a reference electrical signal obtaining unit, configured to subtract a test electrical signal from an electrical signal transformed by the PD from the first optical signal output by the LD to obtain a reference electrical signal, wherein the test electrical signal indicates the data bit stream of the first optical signal output by the LD;

a transmission delay obtaining unit, configured to adjust the delay of the test electrical signal, if a data bit stream indicated by the reference electrical signal is different from the data bit stream indicated by the test electrical signal and an amplitude of the reference electrical signal is greater than a preset amplitude threshold, until the data bit stream indicated by the test electrical signal is the same as the data bit stream indicated by the reference electrical signal, so as to obtain a transmission delay of the PD; and an amplitude coefficient obtaining unit, configured to adjust an amplitude of the test electrical signal, if the amplitude of the reference electrical signal is greater than the preset amplitude threshold, until the amplitude of the reference electrical signal is less than or equal to the amplitude threshold, and use a ratio of the adjusted amplitude of the test electrical signal to the original amplitude of the test electrical signal as an amplitude coefficient of the PD, wherein the first obtaining module comprises a monitoring PD configured to receive the first optical signal output by the LD, perform optical-to-electrical transformation on the received first optical signal to generate a fifth electrical signal, amplify the fifth electrical signal at a first transimpedance amplifier to generate the first electrical signal, and output the first electrical signal to the adjusting module before the amplitude and delay of the first electrical signal is adjusted, the adjusting module comprising a multiplier circuit and a delay circuit, and wherein the second obtaining module is configured to obtain the second electrical signal output by the PD by receiving an electrical signal output by the PD and amplifying the received electrical signal at a second transimpedance amplifier to generate the second electrical signal before subtracting the third electrical signal from the second electrical signal.

3. The crosstalk suppression apparatus according to claim 2, wherein the adjusting module is configured to adjust the amplitude and delay of the first electrical signal, respectively, based on the amplitude coefficient of the PD and the transmission delay of the PD to obtain the third electrical signal.

4. A crosstalk suppression apparatus, comprising:

a memory, configured to store program instructions; and a processor, configured, when executing the program instructions, to:

subtract a test electrical signal from an electrical signal transformed by a photodiode (PD) in an optical transceiver module from a first optical signal output by a laser diode (LD) in the optical transceiver module to obtain a reference electrical signal, wherein the test electrical signal indicates a data bit stream of the first optical signal output by the LD;

adjust a delay of the test electrical signal, if a data bit stream indicated by the reference electrical signal is different from the data bit stream indicated by the test electrical signal and an amplitude of the reference electrical signal is greater than a preset amplitude threshold, until the data bit stream indicated by the test electrical signal is the same as the data bit stream indicated by the reference electrical signal, so as to obtain a transmission delay of the PD;

adjust an amplitude of the test electrical signal, if the amplitude of the reference electrical signal is greater than the preset amplitude threshold, until the amplitude of the reference electrical signal is less than or equal to the amplitude threshold, and using a ratio of the adjusted amplitude of the test electrical signal to the original amplitude of the test electrical signal as an amplitude coefficient of the PD;

after adjusting the amplitude of the test electrical signal, obtain a first electrical signal, wherein the first electrical signal indicates the data bit stream of the first optical signal output by the LD, obtain a second electrical signal output by the PD, adjust an amplitude and a delay of the first electrical signal based on the amplitude coefficient of the PD and the transmission delay of the PD, respectively, to obtain a third electrical signal, wherein the third electrical signal indicates, as part of the second electrical signal, an electrical signal transformed by the PD from the first optical signal transmitted by the LD, control a subtractor circuit to subtract the third electrical signal from the second electrical signal to obtain a fourth electrical signal transformed by the PD from an optical signal output from an external signal source, and provide the fourth electrical signal to a limiting amplifier, wherein obtaining the first electrical signal comprises receiving the first optical signal output by the LD at a monitoring PD, performing optical-to-electrical transformation on the received first optical signal by the processor to generate a fifth electrical signal, amplifying the fifth electrical signal at a first transimpedance amplifier to generate the first electrical signal, and receiving the first electrical signal at a communication interface before the amplitude and delay of the first electrical signal is adjusted, the communication interface comprising a multiplier circuit and a delay circuit, and wherein obtaining the second electrical signal output by the PD comprises receiving an electrical signal output by the PD and amplifying the received electrical signal at a second transimpedance amplifier to generate the second electrical signal before subtracting the third electrical signal from the second electrical signal.

\* \* \* \* \*